H. E. JOLY.
APPARATUS FOR REMOVING THE HONEY FROM BEEHIVES.
APPLICATION FILED OCT. 30, 1912.
1,092,219.
Patented Apr. 7, 1914.
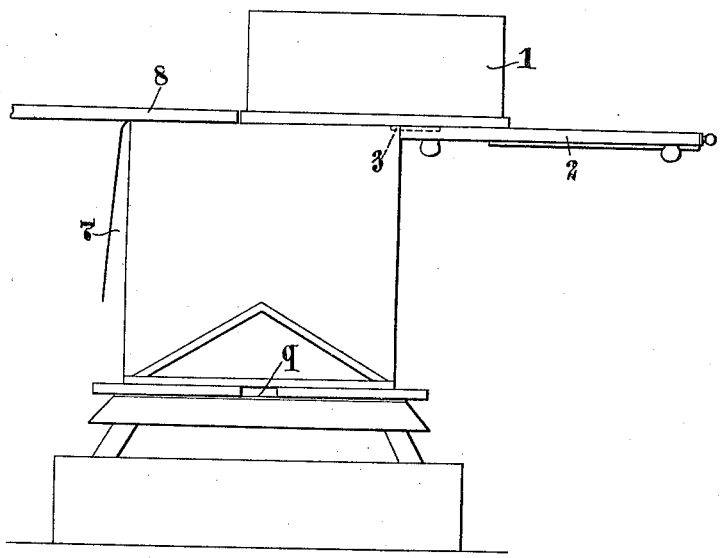
Fig. 1.
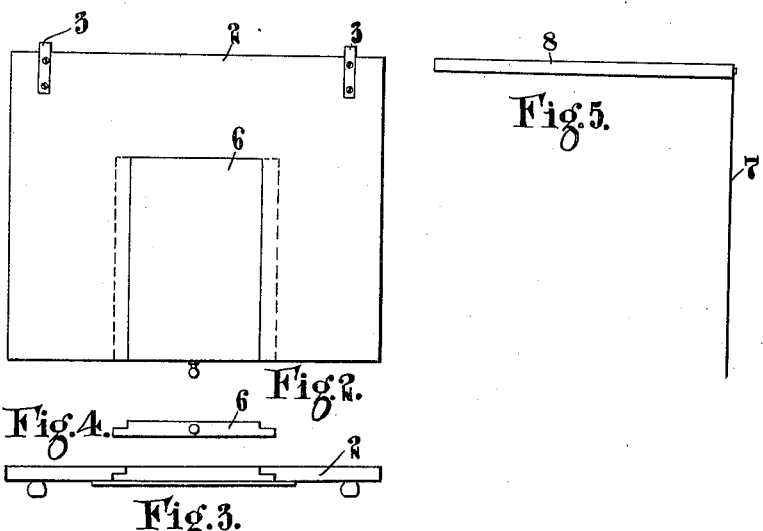
Witnesses.
Philip S. McLean.
Teresa V. Lynch.
Henry Edward Joly
Inventor.
by Axel H. Beeken
Attorney.

UNITED STATES PATENT OFFICE.

HENRY EDWARD JOLY, OF RATHANGAN, IRELAND.

APPARATUS FOR REMOVING THE HONEY FROM BEEHIVES.

1,092,219. Specification of Letters Patent. Patented Apr. 7, 1914.

Application filed October 30, 1912. Serial No. 728,643.

*To all whom it may concern:*

Be it known that I, HENRY EDWARD JOLY, a subject of the King of Great Britain and Ireland, and residing at Millgrove House, Rathangan, Kildare, Ireland, have invented a certain new and useful Improved Apparatus for Removing the Honey from Beehives, of which the following is a specification.

This invention relates to beehives in which the honeycomb is supported in crates or the like and has for its object the provision of an improved apparatus for removing the honeycomb from the hives without injuring the bees, such being capable of practice with or without the aid of gloves, veils or fumigation or subduers of any kind and further obviates the possibility of stings.

The apparatus for effecting the removal of the honeycomb preferably consists in the provision of a crate or receptacle (or a plurality thereof) which is closed on all sides but open underneath; this crate is adapted to be entirely closed by a platform or the like which has a slide or door in order that when desired, a way out for the bees may be made. The temporary covering for the hive which consists of a quilt or the like, is preferably attached to a flat board or the like, which is in size a little larger than the opening of the hive from which the crate had been removed.

In the accompanying drawings, Figure 1 is a front elevation of a beehive showing the removal of the crate therefrom. Fig. 2 is a plan, and Fig. 3 a front elevation of the platform adapted to close the crate, while Fig. 4 is a detail view of the slide or door for closing the escape opening in the platform. Fig. 5 is a side view showing the temporary quilt or covering attached to the board adapted to assist in placing the covering in position.

In carrying out the invention according to one convenient mode as applied to a beehive of the ordinary box form, a crate 1, is provided which is closed on all sides save underneath, which is open, the honeycomb and some of the bees being lodged therein.

In the drawings, the hive is shown with the roof removed and the crate being slid upon a platform 2. This platform is provided upon the side adapted to abut against the hive with two projections 3, which may be conveniently formed of two flat pieces of iron screwed to the board, or the platform may be provided with a clip or clamp to hold such in position. The projections 3 are adapted to lie in slots formed in the upper edge of one side of the hive so that a tight joint is made when the platform is brought into position, thus preventing the escape of any bees betwixt the hive and platform. Upon the opposite side of the platform a cut-out portion is provided. When it is desired that the bees should not escape from the crate, and in the normal condition when adapted to receive the crate from the hive, this opening is closed by a slide piece 6 door or the like which prevents any of these escaping.

A temporary covering for the hive is indicated at 7, which is lightly tacked to the end of a board 8, the board being slightly larger in area than the opening at the top of the hive.

When it is desired to remove the honeycomb from the beehive, the operator will wait until it is dark and all the bees are in the hive when he will close the opening or entrance to the hive indicated at 9 with a cloth or plug of some sort placing it firmly in so that the bees cannot find egress through their usual exit. The operator will then remove the top or cover of the hive and loosen the crate, 1, from the body of the hive in the usual way without letting any of the bees escape and will place the receiving platform or board 2 against the side of the hive as shown in Fig. 1, the board 8 with the canvas quilt attached being now placed preferably by a second person against the side of the crate to be removed so that none of the bees can escape in this direction while the crate is being moved off the hive on to the receiving board or platform 2. When the crate has been placed in position upon the board, the temporary covering will be in position over the top of the hive when it may be detached from the board 8 employed for positioning it. The usual woolen quilt and top of the hive are then replaced upon the hive, this being done before taking the cloth or plug out of the entrance. The crate upon the receiving board is then transferred to an open house or shed or any suitable shelter some distance from the hive and the receiving board or platform placed on its feet on the floor or any other flat surface when the operator will remove the slide 6 and strip off the usual quilt which covers the top of the crate. In the morning the bees will fly back to their hive leaving the honeycomb in the crates free to be removed by the operator.

When moving crates with honey off the hive on to receiving platform (Fig. 2) a piece of flat sheet iron or tin, or the like, having one side bent up may take the place of the removing board 8 and quilt 7. This will prevent any bees from escaping in the same manner as would the removing board with quilts attached. When the crates of honey have been slid off and removed, the fresh crates can be placed on the sheet iron and held in such a position that they will be correctly placed on the hive preparatory to placing them in the hive. The sheet iron may be drawn from beneath them. This can be done without letting any of the bees escape. The quilts or other coverings can also be placed on the hive in the same manner if required or this plate could be pushed in between the hive and the crates of honey before they were slid on to the platform. When it is desired to put a fresh crate or crates on the hive in place of those removed with honey, the fresh crates having the usual quilt or covering held on top can be placed on the quilt or covering 7 when the removing board (8) has been taken off. The crates can be held in the correct position on the hive and the quilt or covering 7 positioned by the removing board 8, drawn out without letting any bees escape. The top can then be put on the hive and the entrance opened.

It will be seen that this apparatus for removing the honey may be used if desired with the aid of gloves or a veil or any known kind of stupefier or any device by which the bees are rendered unconscious.

Having now described my invention, what I claim as new and desire to secure by Letters Patent is:—

1. Apparatus for obtaining the honey from beehives having in combination a removable crate containing the honeycomb and some of the bees, a platform for receiving said crate and for preventing the escape of bees therefrom, and a closing member for preventing the escape of bees from the hive while the said crate is being removed therefrom.

2. Apparatus for obtaining the honey from beehives having in combination, a removable crate containing the honey comb and some of the bees, a platform for receiving said crate and for preventing the escape of bees therefrom, a door in said platform adapted to allow the escape of bees from said crate, and a closing member for preventing the escape of bees from the hive while said crate is being removed therefrom.

3. Apparatus for obtaining the honey from beehives, having in combination, a hive, a wall of said hive having recesses in the top thereof, a removable crate containing the honeycomb and some of the bees, a platform for receiving said crate and for preventing the escape of bees therefrom, projections upon said platform adapted to coöperate with said recesses, and a closing member for preventing the escape of bees from said hive while the crate is being removed therefrom.

4. Apparatus for obtaining the honey from beehives having in combination, a hive, a wall of said hive having recesses in the top thereof, a removable crate containing the honeycomb and some of the bees, a platform for receiving said crate and for preventing the escape of bees therefrom, a door in said platform adapted to allow the escape of bees from said crate, projections upon said platform adapted to coöperate with said recesses and a closing member for preventing the escape of bees from said hive while the crate is being removed therefrom.

5. Apparatus for obtaining the honey from beehives having in combination a removable crate containing the honeycomb and some of the bees, a platform for receiving said crate and for preventing the escape of bees therefrom, a closing member for preventing the escape of bees from the hive while said crate is being removed therefrom, and a quilt attached to said closing member for the purpose set forth.

6. Apparatus for obtaining the honey from beehives having in combination, a removable crate containing the honeycomb and some of the bees, a platform for receiving said crate and for preventing the escape of bees therefrom, a door in said platform adapted to allow the escape of bees from said crate, a closing member for preventing the escape of bees from said hive while the crate is being removed therefrom and a quilt attached to said closing member for the purpose set forth.

7. Apparatus for obtaining the honey from beehives having in combination, a hive, a wall of said hive having recesses in the top thereof, a removable crate containing the honeycomb and some of the bees, a platform for receiving said crate and for preventing the escape of bees therefrom, a door in said platform adapted to allow the escape of bees from said crate, projections upon said platform adapted to coöperate with said recesses, a closing member for preventing the escape of bees from said hive while the crate is being removed therefrom and a quilt attached to said closing member for the purpose set forth.

In testimony whereof I have signed my name to this specification in the presence of two subscribing witnesses.

HENRY EDWARD JOLY.

Witnesses:
JAMES ROBINSON,
VALENTINE FRANCIS KIRWAN.